United States Patent
Middleton

(10) Patent No.: US 8,556,328 B1
(45) Date of Patent: Oct. 15, 2013

(54) MAGNETIC SUNSHADE ATTACHMENT

(75) Inventor: Nicholas Keith Middleton, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/473,764

(22) Filed: May 17, 2012

(51) Int. Cl.
*B60J 9/00* (2006.01)

(52) U.S. Cl.
USPC ..... 296/143; 296/97.8; 160/23.1; 160/370.23

(58) Field of Classification Search
USPC .................. 296/97.8, 143; 160/23.1, 370.22
See application file for complete search history.

(56) References Cited

U.S. PATENT DOCUMENTS

| | | | |
|---|---|---|---|
| 4,335,773 A | 6/1982 | Masi | |
| 4,497,515 A * | 2/1985 | Appelson | 296/141 |
| 4,932,711 A | 6/1990 | Goebel | |
| 5,067,546 A | 11/1991 | Jeuffray et al. | |
| 5,653,277 A * | 8/1997 | Kerner et al. | 160/370.22 |
| 6,098,698 A * | 8/2000 | King-Darr | 160/290.1 |
| 7,185,694 B2 | 3/2007 | Dunn et al. | |
| 7,401,840 B2 | 7/2008 | Schnoblen et al. | |
| 7,475,935 B2 | 1/2009 | Ercolano | |
| 2011/0297339 A1 * | 12/2011 | Yi et al. | 160/370.21 |

* cited by examiner

*Primary Examiner* — Lori Lyjak
(74) *Attorney, Agent, or Firm* — Gifford, Krass, Sprinkle, Anderson & Citkowski, P.C.

(57) ABSTRACT

The present invention provides for a frame on the vehicle, the frame operable to accept the window. The frame having a first edge and an opposed spaced apart second edge. A shade having a fixed end and a free end. The fixed end mounted to the first edge of the frame. The assembly further including at least one magnet wherein the at least one magnet is connected to the free end of the shade. The shade is operable to extend away from the first edge of the frame and connect to the second edge of the frame. The magnet attached to the free end of the shade connects to a ferrous material provided on the second edge of the frame. The magnet attachment allows for a user to blindly extend the shade assembly to an extended position.

15 Claims, 2 Drawing Sheets

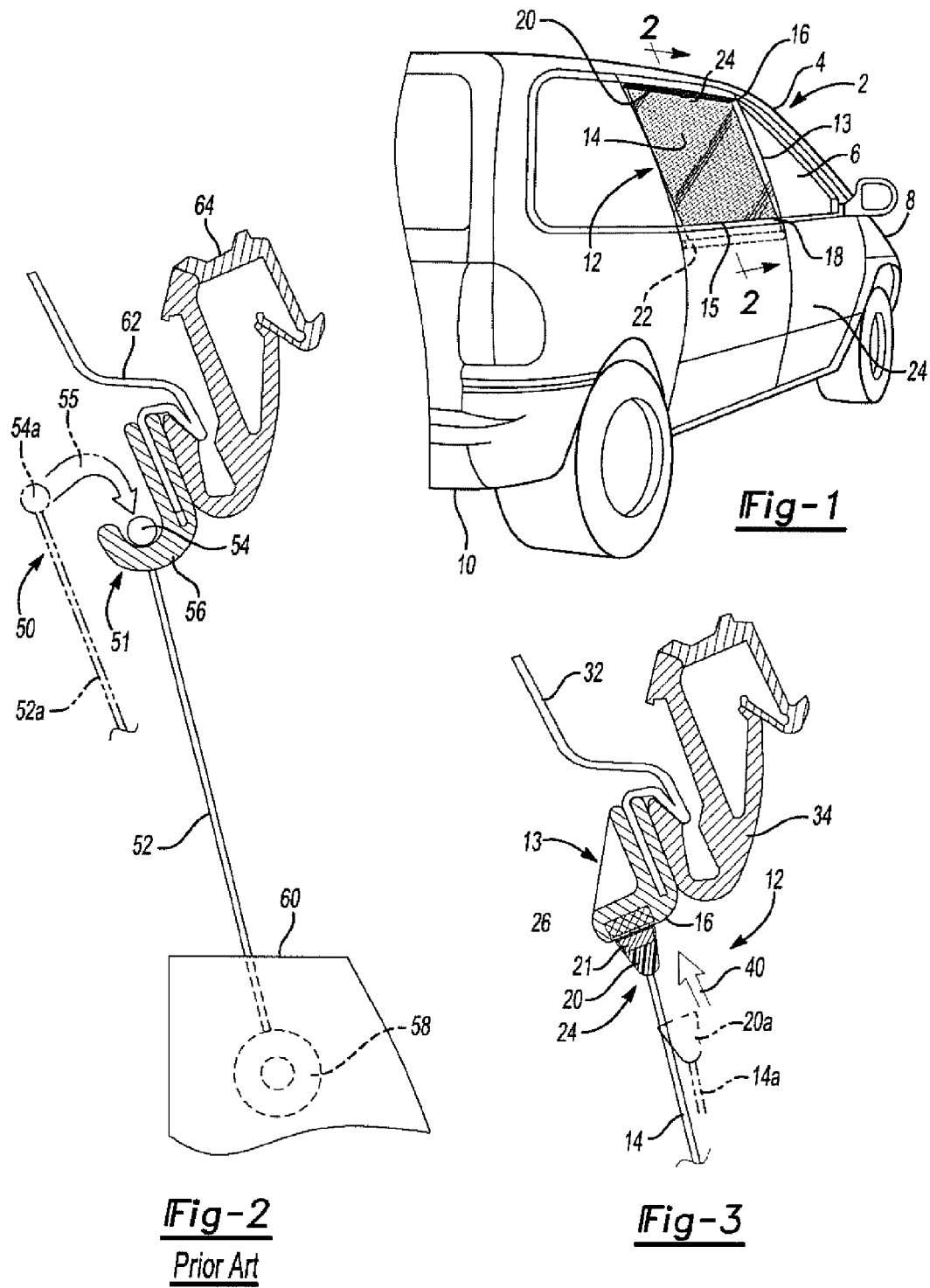

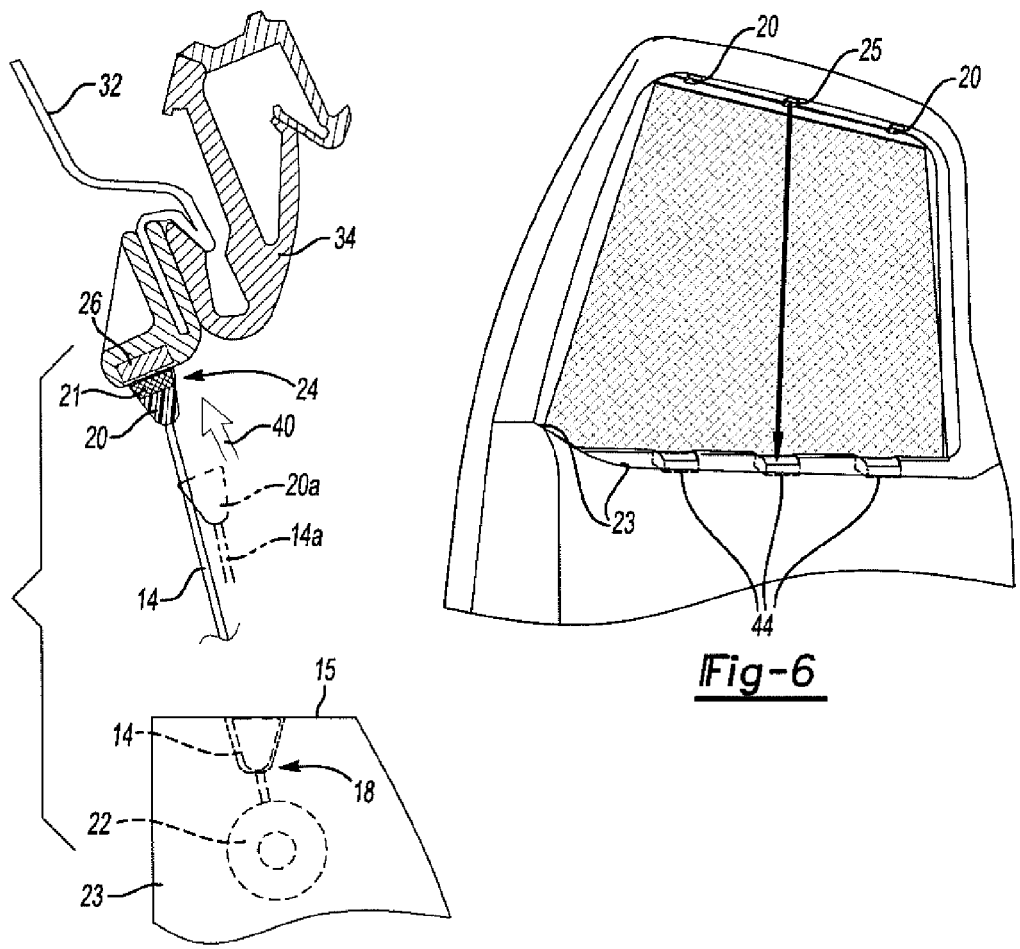
Fig-4
Fig-6
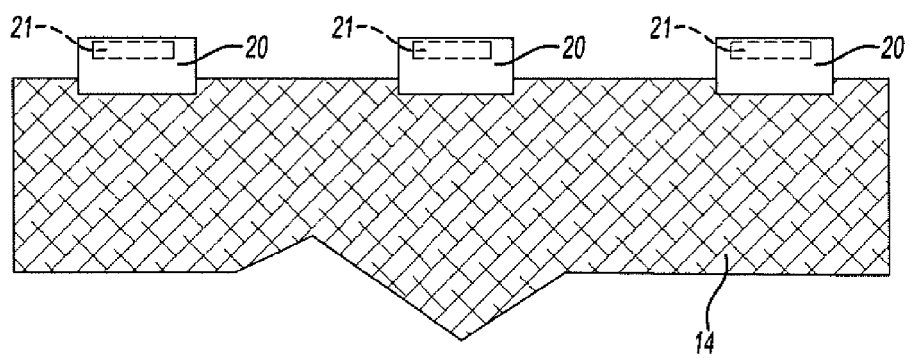
Fig-5

MAGNETIC SUNSHADE ATTACHMENT

FIELD OF THE INVENTION

The present invention relates generally to vehicle sunshades. More particularly, this invention relates to attachment structures for vehicle sunshades covering windows.

BACKGROUND OF THE INVENTION

Sunshades provided within a vehicle to cover windows to block sun entering the vehicle interior are well known. Commonly known sunshades utilize a flexible shade operable to cover a window. The sunshade includes a fixed end and a free end. The fixed end is traditionally mounted to a rollable cylinder. The rollable cylinder is mounted within the vehicle interior, and particularly within the paneling of the vehicle. The sunshade roll assembly may be spring actuated to allow for retraction and rerolling of the sunshade about the rollable cylinder.

To use the sunshade assembly, the user must pull on the free end of the sunshade and attach the free end to an opposing edge of the vehicle window. It is commonly known to use a hook structure to attach the sunshade in the open position to an opposing edge of the window frame to secure the sunshade in an open position. The hook is either provided on the free end of the sunshade assembly wherein the window frame includes corresponding loop structure to accept the hooks. Alternatively, the window frame includes hook structure operable to accept loop-like structure provided on the free end of the shade to secure the shade in the open position.

Connecting the loop structure to the hook structure to secure the shade in the open position proves to be a difficult task. Very frequently users have difficulty connecting the loop structure to the hook structure. The difficulty frequently arises when the user must reach into the rear of the vehicle, or must reach to extend the shade on a slidable door of a minivan when the door is in the open position and one is attempting to extend the shade. Users have little to no guidance when attempting to mate the hook structure with the loop structure to extend the shade.

Other sunshade assemblies are power operated and do not require the use of hooks. These sunshade assemblies frequently include two actuating arms operable to automatically extend the sunshade and do not require the use of attachment structure at the free end of the sunshade.

Accordingly, there exists a need in the field of manual sunshade assemblies to improve attachment structure to allow for easy attachment of the free end of a shade to the frame of a window.

SUMMARY OF THE INVENTION

A sunshade assembly overcoming the disadvantages as described in the background is provided for use over a vehicle window. The sunshade assembly includes a frame on the vehicle, the frame operable to accept the window. The frame having a first edge and an opposed spaced apart second edge. A shade having a fixed end and a free end. The fixed end mounted to the first edge of the frame. The assembly further including at least one magnet wherein the at least one magnet is connected to the free end of the shade. The shade is operable to extend away from the first edge of the frame and connect to the second edge of the frame. The magnet attached to the free end of the shade connects to a ferrous material provided on the second edge of the frame. The magnet attachment allows for a user to blindly extend the shade assembly to an extended position since little manipulation is required by the user to attach the magnets of the free end to the second edge of the frame thereby overcoming the disadvantages of the prior art.

BRIEF DESCRIPTION OF THE DRAWINGS

FIG. 1 illustrates an environmental view of the sunshade assembly in an extended position;

FIG. 2 illustrates a cross-sectional view of the prior art;

FIG. 3 illustrates a cross-sectional view and motion view of the present invention;

FIG. 4 illustrates a cross-sectional view and motion view of the shade in the extended position;

FIG. 5 illustrates a sectional view of the free end of the shade; and

FIG. 6 illustrates a perspective view of the indentations on the panel structure of the present invention.

DETAILED DESCRIPTION OF THE INVENTION

The present invention relates to an improved assembly for attaching a free end of a sunshade assembly to the vehicle when the shade is in the extended position. The free end of the shade includes at least one magnet operable to connect to an edge of a window frame thereby reducing required manipulation of the hook and loop assemblies of the prior art. In a secondary embodiment, magnets may be provided on the second edge of the window frame and the free end of the shade may include a ferrous material allowing for a secure attachment of the free end to the window frame edge.

FIG. 1 illustrates an environmental view of the vehicle 2 having a windshield 4 and a plurality of windows 6. The vehicle 2 further includes a front end 8 and a rear end 10. The sunshade assembly 12 is provided on the vehicle 2. The sunshade assembly 12, in the present embodiment, is shown on the vehicle door disposed over a window. The sunshade assembly 12 further includes the shade material 14 having a free end 24 and a fixed end 18. The sunshade assembly 12 is provided with a corresponding window frame having a first edge 15 and a second edge 16. The shade 14 of the sunshade assembly 12 includes a free end 24 and a fixed end 18. The fixed end 18 is mounted to a roller 22. The shade 14 is operable to wrap around the roller 22 when the shade 14 is in an open and stored position. The roller 22 may include spring mechanisms to assist in retraction of the shade 14. The shade 14 or the roller 22 is attached to the first edge 15 of the frame 13.

Shade 14 further includes a free end 24. A plurality of magnets 20, or a strip of magnets, is provided connected to the free end 24 of the shade 14. In the secondary embodiment, a plurality of magnets 20, or a strip of magnets, is provided attached to the second edge 16 of the frame. The magnets 20 are operable to attach to the second edge 16 of the frame 13. The second edge 16 includes or is made of a ferrous material allowing the magnets 20 to attach to the second edge. In the secondary embodiment, a ferrous material is provided on the free end of the shade 14 operable to connect to a plurality of magnets, or a strip of magnets, mounted to the second edge 16 of the frame 13.

FIG. 2 illustrates the prior art. A sunshade assembly having a hook and loop assembly 50 is provided. A shade 52 is provided having a free end 51. A loop assembly is provided on the free end 51. The loop 54 provided on the free end 51 attaches to a hook structure 56 connected to the vehicle and vehicle structure 62, 64. A roll assembly 58 is provided within the vehicle paneling 60 of the vehicle. The user of the sunshade assembly is required to pull the free end 51 of the shade 52 out of the vehicle paneling 60 to an extended position. The user manipulates the shade 52 to an extended position. The user must then manipulate, as shown by directional arrow 55, the extended shade 52a and loop structure 54a over the hook 56. If the user is reaching to the rear of the vehicle, or if the user is reaching to open and extend the sunshade of a slidable door when the door is in an open position, the attachment of the shade 52 to the hook 56 proves to be extremely difficult.

FIGS. 3-5 illustrate the magnet attachment structure of the present invention. The sunshade assembly 12 includes the shade 14 having a free end 24 and a fixed end 18. The free end 24 includes a magnet 20, or plurality of magnets, or a strip of magnets, including magnet material 21. The frame 13 is provided having a first edge 15 and a second edge 16. In the present embodiment, the second edge 16 includes a ferrous material 26 operable to magnetically connect to the magnet 20 attached to the free end 24 of the shade 14. In a secondary embodiment, the second edge 16 may include magnetic material and the free end 24 of the shade 14 may include ferrous material allowing the second edge having the magnetic material to connect to the free end 24 having the ferrous material. The user extends 40 the shade 14a having the magnet 20a until the free end 24 of the shade 14a makes contact with the second edge 16 of the frame 13. Magnetic forces draw the magnet 20 to the second edge 16 of the frame thereby providing some guidance to the user when extending 40 the shade 14 of the sunshade assembly 12.

A roller 22 is provided within the paneling 23 of the vehicle 2. The roller 22 is operable to have the shade 14 wrap around the roller 22.

FIG. 6 illustrates the magnets 20 of the sunshade 14 in a resting and rolled position. This is a secondary embodiment allowing the magnets 20 and the handle 25 to rest flush within the panel 23. A plurality of indentations 44 are operable to accept the structure of the magnets 22. The indentations 44 allow the magnets to rest flush with the paneling 23. Furthermore, FIG. 6 illustrates a grip or handle 25 provided to allow the user to extend the shade 14 to an open position.

I claim:

1. A sunshade assembly for use in a vehicle over a window, the sunshade assembly comprising:
    a frame on the vehicle, the frame operable to accept the window, the frame having a first edge and an opposed spaced apart second edge;
    a shade having a fixed end and a free end, the fixed end mounted to a first edge of the frame; and
    at least one magnet, the at least one magnet connected to the free end of the shade, the shade operable to extend away from the first edge of the frame, the free end of the shade operable to connect to the second edge of the frame, the at least one magnet of the free end of the shade operable to connect to the second edge of the frame.

2. The sunshade assembly of claim 1 wherein the second edge of the frame includes a ferrous material.

3. The sunshade assembly of claim 1 wherein the shade is a flexible material.

4. The sunshade assembly of claim 1 wherein the shade is at least translucent to block sun.

5. The sunshade assembly of claim 1 wherein the fixed end of the shade is attached to a roller allowing the shade to wrap around the roller.

6. The sunshade assembly of claim 5 wherein the roller is disposed within the vehicle body.

7. The sunshade assembly of claim 1 wherein the second edge includes indentations configured to accept the magnets of the free end of the shade.

8. A sunshade assembly for use in a vehicle over a window, the sunshade assembly comprising:
    a frame on the vehicle, the frame operable to accept the window, the frame having a first edge and an opposed spaced apart second edge;
    a shade having a fixed end and a free end, the fixed end mounted to a first edge of the frame, the shade including a handle on the free end; and
    at least one magnet, the at least one magnet connected to the second edge of the frame, the shade operable to extend away from the first edge of the frame to the second edge, the free end of the shade operable to connect to the second edge of the frame, the at least one magnet of the second edge operable to connect to the free end of the shade.

9. The sunshade assembly of claim 8 wherein the free end of the shade includes a ferrous material.

10. The sunshade assembly of claim 8 wherein the shade is a flexible material.

11. The sunshade assembly of claim 8 wherein the shade is at least translucent to block sun.

12. The sunshade assembly of claim 8 wherein the fixed end of the shade is attached to a roller allowing the shade to wrap around the roller.

13. The sunshade assembly of claim 12 wherein the roller is disposed within the vehicle body.

14. A sunshade assembly for use in a vehicle over a window, the sunshade assembly comprising:
    a frame on the vehicle, the frame operable to accept the window, the frame having a first edge and an opposed spaced apart second edge;
    a shade having a fixed end and a free end, the fixed end mounted to a first edge of the frame; and
    at least one magnet, the at least one magnet connected to the free end of the shade, the shade operable to extend away from the first edge of the frame, the free end of the shade operable to connect to the second edge of the frame, the at least one magnet of the free end of the shade operable to connect to the second edge of the frame, the second edge of the frame having at least one indentation configured to accept the at least one magnet of the free end of the shade.

15. A sunshade assembly for use in a vehicle over a window, the sunshade assembly comprising:
    a frame on the vehicle, the frame operable to accept the window, the frame having a first edge and an opposed spaced apart second edge;
    a shade having a fixed end and a free end, the fixed end mounted to a first edge of the frame, the shade including a handle on the free end; and
    at least one magnet, the at least one magnet connected to the second edge of the frame, the shade operable to extend away from the first edge of the frame to the second edge, the free end of the shade operable to connect to the second edge of the frame, the at least one magnet of the second edge operable to connect to the free end of the shade, the second edge of the frame having at least one indentation configured to accept the handle of the free end of the shade.

* * * * *